United States Patent Office 3,433,778
Patented Mar. 18, 1969

3,433,778
PROCESS FOR THE POLYMERIZATION OF BUTADIENE IN THE PRESENCE OF A CATALYST SYSTEM COMPRISING AN ORGANO Ni OR Co COMPOUND, A CHLORIDE OF Sn OR Ga AND AN ORGANOLITHIUM COMPOUND
Edward William Duck, Dibden Purlieu, and Michael Neil Thornber, Lyndhurst, England, assignors to The International Synthetic Rubber Company Limited, Southampton, England, a corporation of the United Kingdom
No Drawing. Filed May 24, 1966, Ser. No. 552,415
Claims priority, application Great Britain, June 1, 1965, 23,292/65
U.S. Cl. 260—94.3    11 Claims
Int. Cl. C08d *1/14;* B01j *11/84*

ABSTRACT OF THE DISCLOSURE

A process for the preparation of polybutadiene in which at least 80% of the monomer units are present in cis 1,4 addition structure, wherein butadiene is polymerized in the presence of a catalyst system obtained by bringing together (A) a compound which is preferably soluble in an organic solvent selected from a group comprising nickel or cobalt carboxylic acid salts and organic complex compounds wherein the metal atom is other than zerovalent, (B) a compound selected from the group comprising the chlorides of gallium and tin, and (C) an organo-metallic compound of lithium selected from the group comprising lithium alkyls, lithium aryls and lithium aralkyls, the lithium component (C) only being contacted with the other components of the catalyst system when in the presence of butadiene.

---

This invention relates to the polymerization of butadiene to a rubbery polymer of high cis 1,4 structure.

According to the present invention, polybutadiene, in which at least 80% of the monomer units are present in cis 1,4 addition structure, is prepared by polymerizing butadiene in the presence of a catalyst system obtained by bringing together (A) a nickel or cobalt compound not containing a halogen directly attached to the metal atom, (B) a tin or gallium chloride and (C) a lithium alkyl, the lithium component (C) only being contacted with the other components aryl or aralkyl, of the catalyst system when in the presence of butadiene.

The cis 1,4 content of the polybutadiene, at least 80%, is usually greater than 90%, e.g., 95.2% cis, 1.9% trans, 2.9% vinyl 1,2. The trans content of the polymer varies with the cis content, the vinyl content remaining substantially constant. The molecular weight of the polybutadiene prepared using this catalyst system lies within the range 15,000–100,000.

All three components in this catalyst combination are necessary to polymerize butadiene to polybutadiene of high cis 1,4 structure and no two components, without the third, will work satisfactory.

It has been found that the molecular weight of the product and the rate of polymerization are affected by the molar ratios of the catalyst components, A:B and C:B. The ratio of component (A) to component (B) should lie within the range 0.01–1.0:1, preferably within the range 0.05–0.25:1 and the ratio of component (C) to component (B) should be within the range 0.5–2.5:1, preferably within the range 0.8–1.5:1.

Preferably the nickel or cobalt compound is one which is soluble in organic solvents such as hexane or benzene. Examples of suitable nickel compounds include nickel acetylacetonate, nickel octoate, nickel di-isopropylsalicylate, nickel naphthenate, nickel benzoate and nickel acetoacetate. Nickel di-isopropylsalicylate, described in our pending British application No. 49,679/64, is a particularly suitable nickel compound. Suitable cobalt compounds include cobalt acetylacetonate, cobalt octoate and cobalt di-isopropylsalicylate. These compounds are nickel or cobalt carboxylic acid salts or organic complexes in which the metal atom is other than zerovalent.

Component (B) may be either tin tetrachloride or gallium trichloride. Examples of suitable lithium compounds for component (C) include n-butyl lithium, ethyl lithium, phenyl lithium, octyl lithium, sec-butyl lithium and isobutyl lithium.

The polymerization is preferably carried out in the presence of a substantially dry hydrocarbon solvent such as hexane or benzene. However, traces of water, for example, within the range 1–20 parts per million in the solvent, dependent upon catalyst concentration, may have advantageous effects on the rate of polymerization and help to regulate the molecular weight of the product.

The temperature at which the polymerization is performed is usually within the range 0° C. to +100° C. but polymerization may be performed at higher and lower temperatures. The preferred temperature range is from 40° C. to 60° C. At the lower temperatures, 0–20° C., some polymer is formed, but yields are comparatively low. The temperature used also affects the molecular weight of the product. Thus at low temperatures polybutadiene is obtained having a higher molecular weight than that obtained at high temperatures.

It has been found that the mode of the addition of the catalyst components is important to obtain high rates of polymerization and preferably the lithium component (C) does not come into contact with either the tin or gallium chloride (B), or the nickel or cobalt compound (A) in the absence of butadiene. If the butadiene is designated component (D) then the following orders of addition are acceptable:

| | |
|---|---|
| (A+B), D, C | D, B, A, C |
| A, B, D, C | D, C, (A+B) |
| B, A, D, C | C, D, (A+B) |
| D, (A+B), C | A, D, B, C |
| D, A, B, C | |

Of these, D, A, B, C is particularly preferred.
Orders of addition as follows are not desirable:

| | |
|---|---|
| A, B, C, D | C, B, A, D |
| (A+B), C, D | C, A, D, B |
| C, A, B, D | C, B, D, A |
| C, (A+B), D | |

It has also been found advantageous to add the component (C) in two portions. The first aliquot added to the butadiene plus solvent is completely deactivated by the impurities in the butadiene and solvent. The amount of component (C) added at this stage is preferably 75% of the theoretical "catalyst demand" for purification.

An improvement in the work up of the catalyst system has also been found when the A and B components are added separately, rather than being premixed together, i.e., (A+B), followed by addition of either all component (C), or the "active" C component.

Thus a particularly preferred order of addition is: (1) mixed feed of butadiene+hexane, (2) addition of an initial portion of component (C), (3) addition of component (A), (4) addition of component (B) and finally (5) addition of "active" portion of component (C). The A and B components may also be added simultaneously to the mixed feed, in the correct molar proportions. Using the five-step order of addition indicated above, the "premix" (A+B) is made in situ, in the polymerization medium, in the presence of the butadiene.

The results obtained on several examples polymerized in accordance with the present invention are given in the accompanying table. The reactions were performed in a clean, dry nitrogen-purged bottle of 250 ml. capacity, the bottle fitted with a screw cap containing a hole and a neoprene gasket to enable ingredients and solutions to be added by means of a hypodermic syringe. After filling with 160 cc. hexane followed by 40 cc. butadiene and the catalyst components, each bottle was placed in a constant temperature bath, fitted with an agitator mechanism, for ten hours. The polymers were worked up by pouring the reaction solution into ethanol when the product precipitated. The polybutadienes were carefully dried under nitrogen, weighed and an I.R. analysis of the cis 1,4 content made.

| Example No. | Order of addition | LiBu Concentration mols in 40 cc. butadiene | LiBu/SnCl₄ ratio | Ni Dips/SnCl₄ ratio | Polymerization temperature (° C.) | Yield polybutadiene gas | Cis content of polymer |
|---|---|---|---|---|---|---|---|
| 1 | (A+B), D, C | 0.42 | 1 | 1 | 55 | 18 | 96.1 |
| 2 | (A+B), D, C | 0.42 | 1 | 1 | 40 | 5 | 96.2 |
| 3 | (A+B), D, C | 0.42 | 1 | 0.5 | 55 | 14 | 95.6 |
| 4 | (A+B), D, C | 0.42 | 0.9 | 0.2 | 55 | 3 | 94.8 |
| 5 | A, B, C, D | 0.42 | 1 | 1 | 55 | 0.5 | 96 |
| 6 | C, (A+B), D | 0.42 | 1 | 1 | 55 | 0.7 | 93.6 |
| 7 | (A+B), D, C | 0.42 | ¹1 | ²1 | 55 | 10 | 95.8 |

¹ LiBu/GaCl₃.
² Ni dips/GaCl₃.

The following Examples 8–11 show the working of the invention when component (C) is added in two portions:

Example 8

N-butyl lithium (10% wt./vol.) was diluted to 0.5% with pre-purified hexane, under dry oxygen-free nitrogen.

Nickel di-isopropyl salicylate Ni dips) was used as a 2% solution in pre-purified hexane and SnCl₄ as a 2% solution in benzene.

The polymerization was conducted in a 10 oz. hydrogen peroxide bottle which was first dried at 170° C. for 12 hours and on cooling was flushed with nitrogen (prepurified for ½ hour). The bottle was fitted with a vacuum-dried rubber gasket and a screw aluminum cap. 25 gm. of dry gaseous butadiene was condensed into the bottle, now cooled to −40° C., and this was followed by 90 ml. of pure hexane from a hypodermic syringe.

Butyl lithium (0.058 mM.) was then added to react with residual impurities in the system followed by nickel dips (0.053 mM.) and stannic chloride (0.53 mM.) and the active butyl lithium (0.53 mM.) in that order. Five minutes was allowed for the nickel dips, SnCl₄ and butadiene to react. The bottle was placed in a water bath in a wire cage at 45° C. for 8 hours. At the end of this time, the bottle was removed and sufficient antioxidant (Stavox) was added to provide approximately 1–2% by weight of anti-oxidant on the polymer. The "cement" was then coagulated with methanol and the precipitated polymer was dried under vacuum at 40° C. 50% yield of polymer of inherent viscosity 1.2 was obtained.

The product was examined by infra-red analysis by the method of Hampten (Anal. Chem. 1949 21, 923–926). The cis 1,4 content of the polymer was 95.3%, 2.0% trans 1:4 and 2.7% vinyl 1:2.

Example 9

The procedure of Example 8 was followed, and the butadiene polymerized with the following catalyst charge: butyl lithium (0.058 mM.) nickel dips (0.159 mM.) stannic chloride (0.53 mM.), butyl lithium (0.53 mM.).

The polymerization was carried out at 45° C.

Polymer was obtained in 40% yield having an inherent viscosity of 1.0.

Example 10

The procedure of Example 8 was followed and the polymerization carried out at 25° C.

Polymer was obtained in 15% yield with an inherent viscosity of 2.0.

Example 11

The procedure of Example 8 was followed and the butadiene polymerized with the following catalyst charge butyl lithium (0.058 mM.) nickel dips (0.53 mM.) stannic chloride (0.53 mM.) and butyl lithium (0.53 mM.).

At 45° C., 10% yield of polymer was obtained with an inherent viscosity of 0.5 and micro structure corresponding to 92.1% cis 1:4, 5.2% trans 1:4. 2.7% vinyl 1:2.

What is claimed is:

1. A process for the preparation of polybutadiene in which at least 80% of the monomer units are present in cis 1,4 addition structure, wherein butadiene is polymerized in the presence of a catalyst system obtained by bringing together (A) a compound selected from the gruop comprising cobalt or nickel carboxylic acid salts and organic complexes in which the metal atom is other than zerovalent, (B) a compound selected from the group comprising the chlorides of gallium and tin and (C) an organo-metallic compound of lithium selected from the group comprising lithium alkyls, lithium aryls and lithium aralkyls, the lithium component (C) only being contacted with the other components of the catalyst system when in the presence of butadiene.

2. A process for the preparation of polybutadiene in which at least 80% of the monomer units are present in cis 1,4 addition structure, wherein butadiene is polymerized in the presence of a catalyst system obtained by bringing together (A) a compound selected from the group comprising cobalt or nickel carboxylic acid salts and organic complexes in which the metal atom is other than zerovalent, (B) a compound selected from the group comprising the chlorides of gallium and tin and (C) an organo-metallic compound of lithium selected from the group comprising lithium alkyls, lithium aryls and lithium aralkyls, in which the molar ratio of component (A) to component (B) lies within the range 0.01–1.0:1 and the molar ratio of component (C) to component (B) lies within the range 0.5–2.5:1, the lithium component (C) only being contacted with the other components of the catalyst system when in the presence of butadiene.

3. A process for the preparation of polybutadiene in which at least 80% of the monomer units are present in cis 1,4 addition structure, wherein butadiene is polymerized at a temperature in the range of from 0° C. to 100° C., in the presence of a catalyst system obtained by bringing together (A) a compound selected from the group comprising cobalt or nickel carboxylic acid salts and organic complexes in which the metal atom is other than zerovalent, (B) a compound selected from the group comprising the chlorides of gallium and tin and (C) an organo-metallic compound of lithium selected from the group comprising lithium alkyls, lithium aryls and lithium aralkyls, in which the molar ratio of component (A) to component (B) lies within the range 0.01–1.0:1 and the molar ratio of component (C) to component (B) lies within the range from 0.5–2.5:1, the lithium component (C) only being contacted with the other components of the catalyst system when in the presence of butadiene.

4. A process according to claim 1 in which the molar ratio of component (A) to component (B) lies within the range from 0.05–0.25:1 and the molar ratio of component (C) to component (B) lies within the range from 0.8–1.5:1.

5. A process for the preparation of polybutadiene in which at least 80% of the monomer units are present in cis 1,4 addition structure, wherein butadiene is polymerized in the presence of a catalyst system obtained by bringing together (A) a compound selected from the group comprising nickel di-isopropyl salicylate, nickel acetylacetonate, nickel octoate, nickel naphthenate, nickel benzoate, nickel acetoacetate, cobalt acetylacetonate, cobalt octoate, and cobalt di-isopropyl salicylate, (B) a compound selected from the group comprising tin tetrachloride and gallium trichloride and (C) an organo-metallic compound of lithium selected from the group comprising n-butyl lithium, ethyl lithium, phenyl lithium, octyl lithium, sec-butyl lithium and iso-butyl lithium, in which the molar ratio of component (A) to component (B) lies within the range 0.01–1.0:1 and the molar ratio of component (C) to component (B) lies within the range 0.5–2.5:1, the lithium component (C) only being contacted with the other components of the catalyst system when in the presence of butadiene.

6. A process for the preparation of polybutadiene in which at least 80% of the monomer units are present in cis 1,4 addition structure, wherein butadiene is polymerized in the presence of a catalyst system obtained by bringing together (A) a compound selected from the group comprising nickel di-isopropyl salicylate, nickel acetylacetonate, nickel octoate, nickel naphthenate, nickel benzoate, nickel acetoacetate, cobalt acetylacetonate, cobalt octoate, and cobalt di-isopropyl salicylate, (B) a compound selected from the group comprising tin tetrachloride and gallium trichloride and (C) an organo-metallic compound of lithium selected from the group comprising n-butyl lithium, ethyl lithium, phenyl lithium, octyl lithium, sec-butyl lithium and iso-butyl lithium, in which the molar ratio of component (A) to component (B) lies within the range 0.01–1.0:1 and the molar ratio of component (C) to component (B) lies within the range 0.5–2.5:1, the lithium component (C) only being contacted with the other components of the catalyst system when in the presence of butadiene, and the polymerization being carried out in a substantially dry hydrocarbon solvent.

7. A process according to claim 6 in which the hydrocarbon solvent is selected from the group comprising hexane and benzene.

8. A process according to claim 6 in which traces of water, within the range 1–20 parts per million in the solvent, are added to the solvent.

9. A process according to claim 1 in which the polymerization is carried out at a temperature within the range from 40°–60° C.

10. A process for the preparation of ploybutadiene in which at least 80% of the monomer units are present in cis, 1,4 addition structure, wherein butadiene is polymerized in the presence of a catalyst system obtained by bringing together (A) a compound selected from the group comprising nickel di-isopropyl salicylate, nickel acetylacetonate, nickel octoate, nickel naphthenate, nickel benzoate, cobalt acetylacetonate, cobalt octoate and cobalt di-isopropylsalicylate, (B) a compound selected from the group comprising tin tetrachloride and gallium trichloride and (C) an organo-metallic compound of lithium selected from the group comprising n-butyl lithium, ethyl lithium, phenyl lithium, octyl lithium, sec-butyl lithium and isobutyl lithium, the lithium component (C) only being contacted with the other components of the catalyst system when in the presence of butadiene, the butadiene first being contacted with a proportion of component (C) and thereafter with the components (A) and (B) and finally the balance of component (C) and the polymerization being carried out in the presence of a substantially dry hydrocarbon solvent.

11. A process according to claim 10 in which 75% of the total amount of component (C) for purification is first contacted with the butadiene in the absence of the other catalyst components.

References Cited

UNITED STATES PATENTS 3,328,376  6/1967  Bernemann, et al. ____ 260—94.3

FOREIGN PATENTS 1,139,277  11/1962  Germany.

JOSEPH L. SCHOFER, *Primary Examiner.*

R. A. GAITHER, *Assistant Examiner.*

U.S. Cl. X.R.

252—429